(12) United States Patent
Cha et al.

(10) Patent No.: US 11,971,744 B2
(45) Date of Patent: Apr. 30, 2024

(54) DISPLAY DEVICES OF COMPUTING DEVICES

(71) Applicant: Hewlett-Packard Development Company, L.P., Spring, TX (US)

(72) Inventors: Dong Ryul Cha, Spring, TX (US); Mark Senatori, Spring, TX (US); Ilchan Lee, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 207 days.

(21) Appl. No.: 17/615,357

(22) PCT Filed: Sep. 27, 2019

(86) PCT No.: PCT/US2019/053414
§ 371 (c)(1),
(2) Date: Nov. 30, 2021

(87) PCT Pub. No.: WO2021/061148
PCT Pub. Date: Apr. 1, 2021

(65) Prior Publication Data
US 2022/0229467 A1 Jul. 21, 2022

(51) Int. Cl.
*G06F 1/16* (2006.01)
(52) U.S. Cl.
CPC .......... *G06F 1/1624* (2013.01); *G06F 1/1616* (2013.01); *G06F 1/1647* (2013.01)
(58) Field of Classification Search
CPC ..... G06F 1/1624; G06F 1/1616; G06F 1/1647
USPC ..................................................... 455/575.4
See application file for complete search history.

(56) References Cited

U.S. PATENT DOCUMENTS

| 6,295,038 | B1* | 9/2001 | Rebeske | ............... | G06F 1/1616 |
| | | | | | 361/679.04 |
| 6,667,878 | B2 | 12/2003 | Ponx | | |
| 7,061,472 | B1* | 6/2006 | Schweizer | ............ | G06F 1/1677 |
| | | | | | 361/679.04 |
| 7,136,282 | B1* | 11/2006 | Rebeske | ............... | G06F 1/1654 |
| | | | | | 361/679.55 |
| 9,983,637 | B1 | 5/2018 | Morrison et al. | | |
| 10,296,053 | B1 | 5/2019 | Quinn et al. | | |
| 10,915,147 | B2* | 2/2021 | Liang | .................... | G06F 1/1647 |
| 10,936,020 | B2* | 3/2021 | Chang | .................. | G06F 1/1692 |
| 2005/0083645 | A1* | 4/2005 | Moore | .................. | G06F 1/1667 |
| | | | | | 361/679.08 |

(Continued)

FOREIGN PATENT DOCUMENTS

| EP | 2674834 A2 | 12/2013 |
| KR | 200458261 Y1 | 2/2012 |
| TW | M579314 U | 6/2019 |

*Primary Examiner* — April G Gonzales
(74) *Attorney, Agent, or Firm* — Knobbe, Martens, Olson & Bear, LLP

(57) ABSTRACT

An example computing device includes a hinge, a first housing, a first display device disposed in the first housing, second housing rotatably coupled to the first housing via the hinge, a second display device disposed in the second housing, and a connector coupled to the hinge and the second display device. As an example, in response to a rotation of the first housing relative to the second housing, a first end of the second display device is to slide along a surface of the second housing and a second end of the second display device is to slide along a surface of the first housing.

15 Claims, 6 Drawing Sheets

(56) References Cited

U.S. PATENT DOCUMENTS

| | | | |
|---|---|---|---|
| 2010/0214743 A1* | 8/2010 | Huang | G06F 1/1667 |
| | | | 361/679.01 |
| 2011/0023272 A1* | 2/2011 | Huang | E05D 11/087 |
| | | | 16/362 |
| 2012/0160988 A1* | 6/2012 | Wu | G06F 1/1667 |
| | | | 248/685 |
| 2012/0200990 A1 | 8/2012 | Fyke | |
| 2016/0085271 A1* | 3/2016 | Morrison | G06F 1/1641 |
| | | | 361/679.27 |
| 2016/0224238 A1* | 8/2016 | Rothkopf | G06F 1/1652 |
| 2017/0205855 A1 | 7/2017 | Szeto | |
| 2018/0189012 A1 | 7/2018 | Fang | |
| 2018/0210504 A1* | 7/2018 | Moser | G06F 1/1679 |
| 2018/0373292 A1* | 12/2018 | Perelli | G06F 1/165 |
| 2019/0129476 A1* | 5/2019 | Alva | F03G 7/06 |
| 2020/0064884 A1* | 2/2020 | Liu | G06F 1/1624 |
| 2023/0221774 A1* | 7/2023 | Moon | F16C 11/04 |
| | | | 361/679.27 |

\* cited by examiner

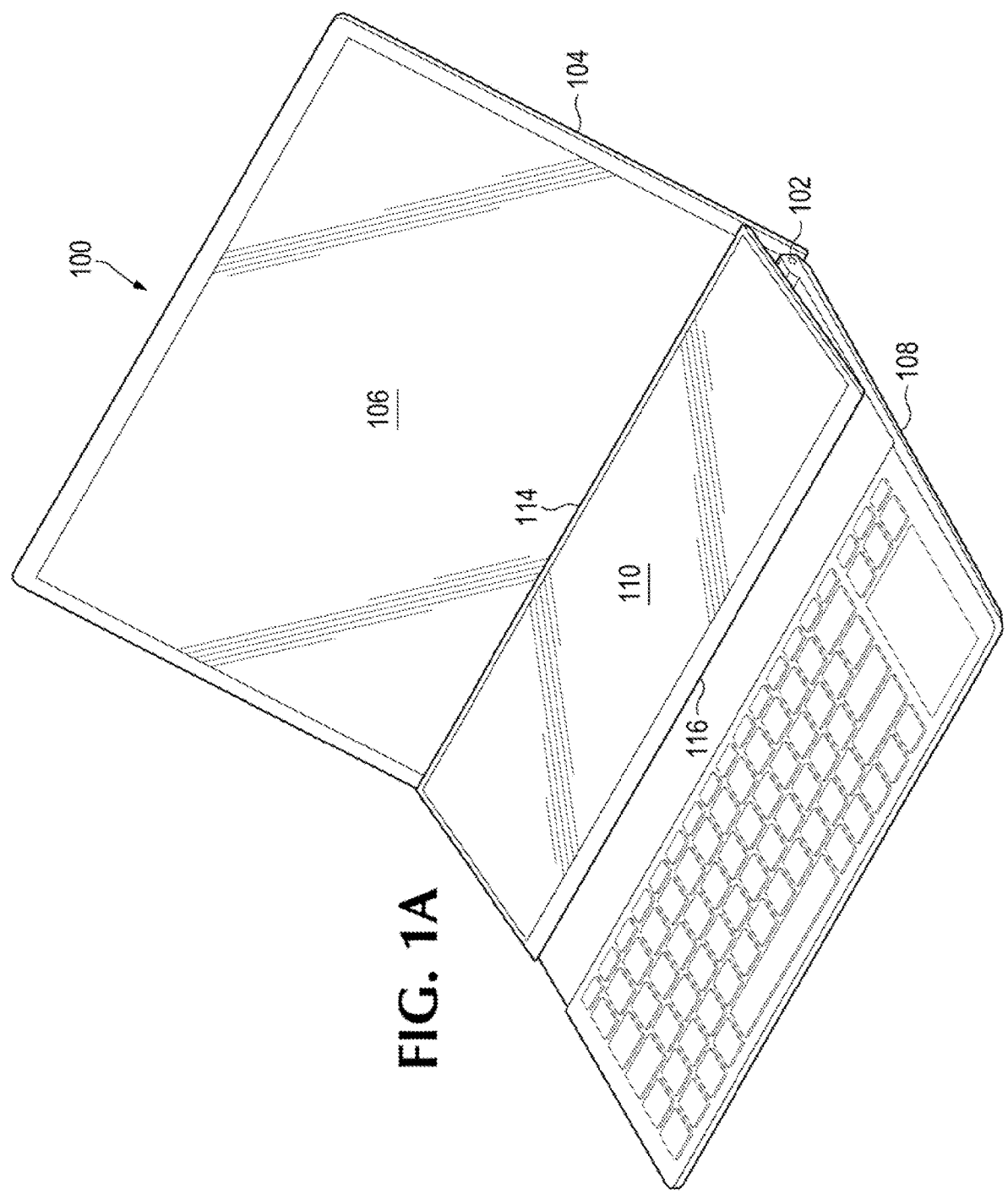

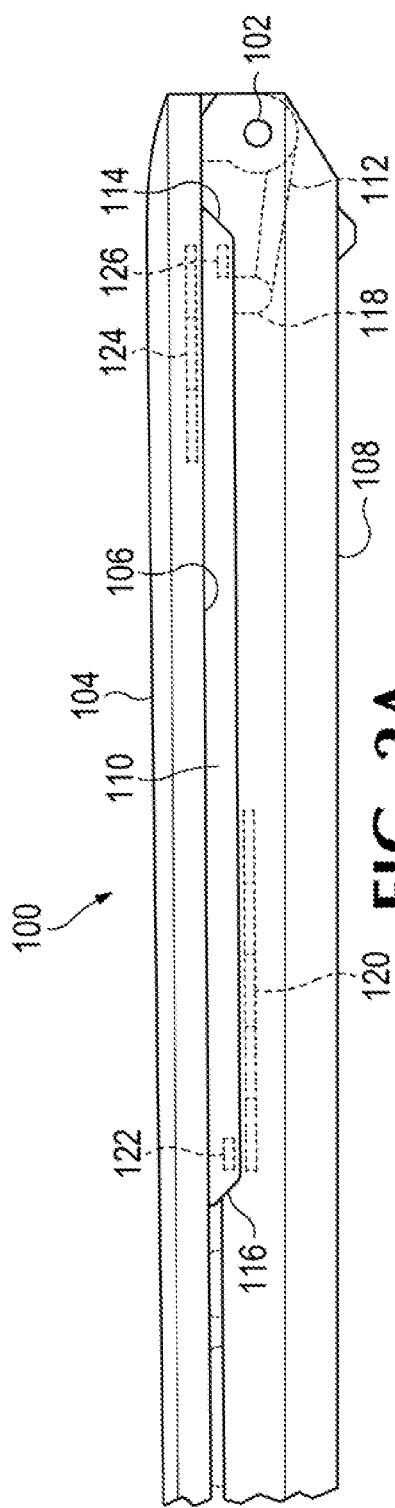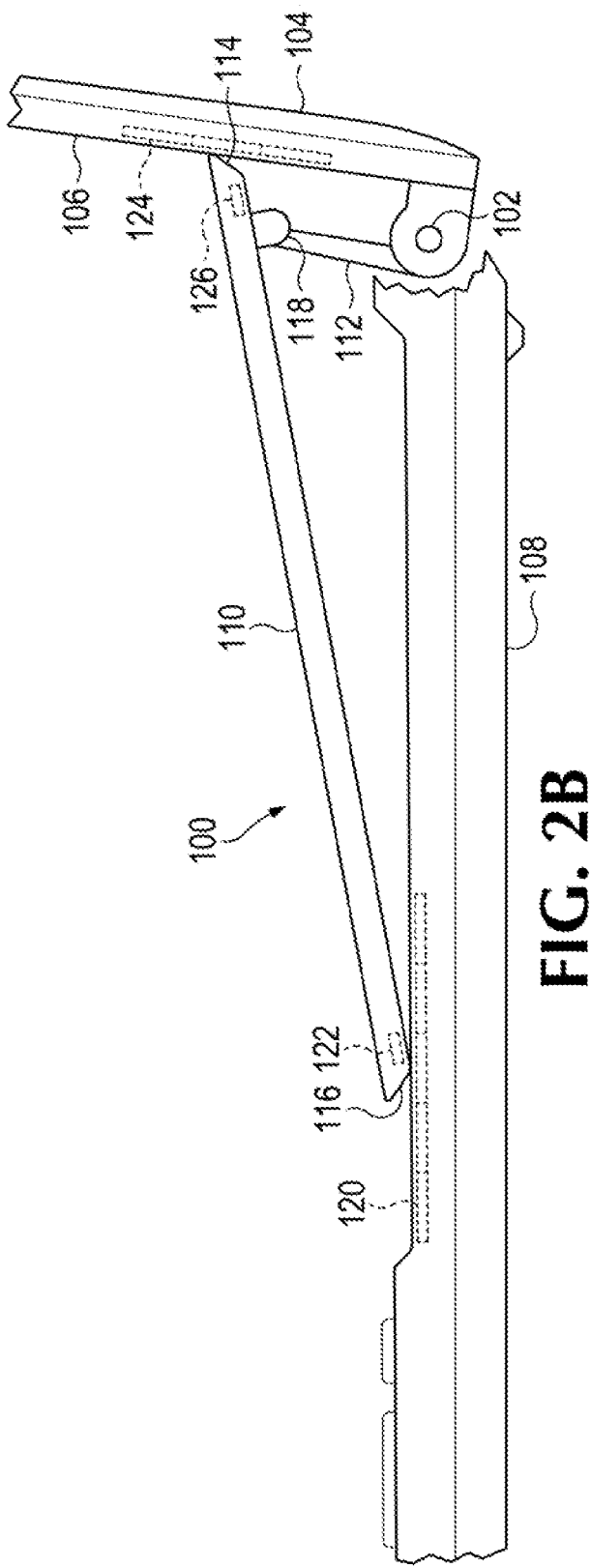

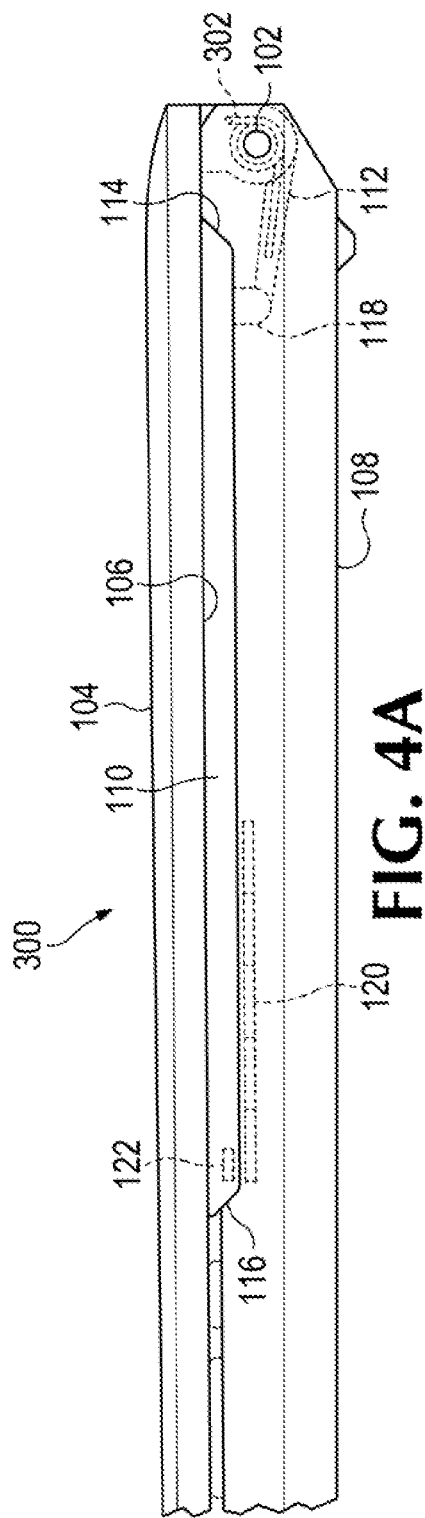
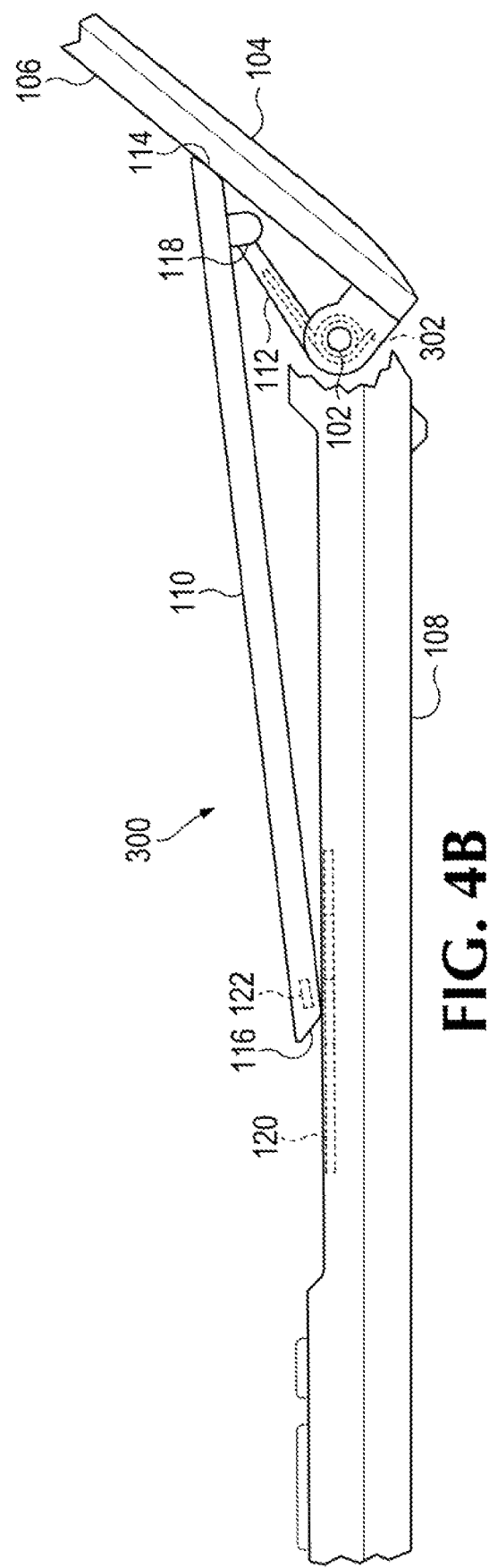

DISPLAY DEVICES OF COMPUTING DEVICES

BACKGROUND

The emergence and popularity of mobile computing has made portable computing devices, due to their compact design and light weight, a staple in today's marketplace. Within the mobile computing realm, notebook computers, or laptops, are one of the more widely used devices and generally employ a clamshell-type design consisting of two housings connected together at a common end via hinges, for example. In most cases, a first housing includes a display device to provide a viewable display to a user, while a second housing or base member includes an area for user input (e.g., touchpad and keyboard). In addition, the viewable display may be a touchscreen (e.g., touchscreen laptop), allowing the user to interact directly with what is displayed by touching the screen with simple or multi-touch gestures.

BRIEF DESCRIPTION OF THE DRAWINGS

FIGS. 1A-B illustrate a computing device including a first display device and a second display device, according to an example;

FIGS. 2A-D illustrate synchronized movement of the second display device of computing device as the first housing is rotated open, according to an example;

FIGS. 4A-B illustrate synchronized movement of the second display device of computing device as the first housing is rotated open, according to an example.

DETAILED DESCRIPTION

Figure 1B:
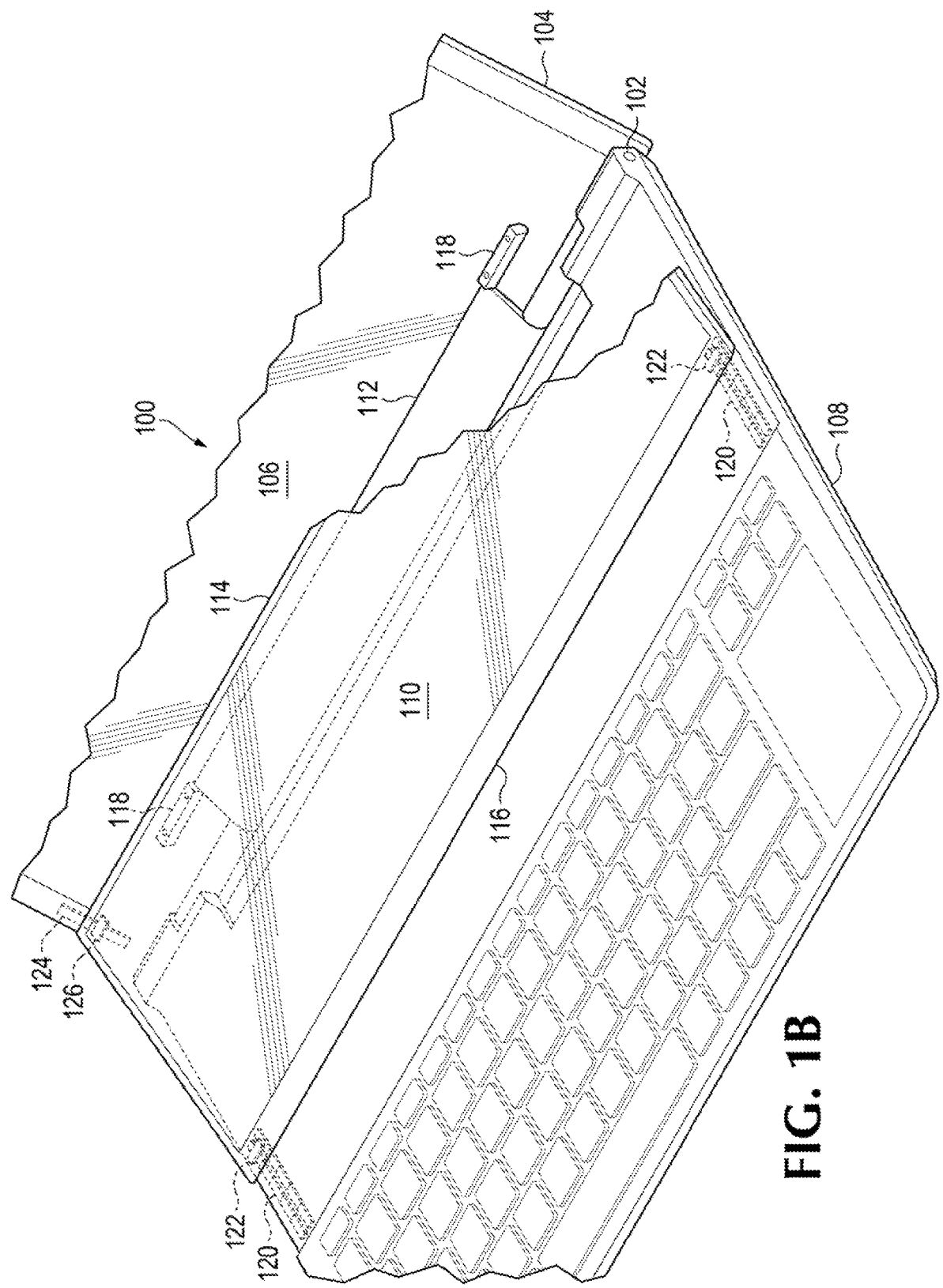

Examples disclosed herein provide an additional display device for computing devices, such as the notebook computer described above. As an example, the additional display device, or secondary display device may be disposed in a second housing of the computing device, separate from the primary display device disposed in the first housing of the computing device. As an example, the secondary display device may be included on a "C" deck of a notebook computer (e.g., a topside of the base member). As will be further described, the portion of the "C" deck including the secondary display device may be elevated as the first housing is rotated with respect to the second housing, thereby providing an appropriate viewing angle of the secondary display device. In addition, movement or elevation of the secondary display device may be synchronized with the opening and closing of the computing device, such that the primary and secondary display devices may provide a seamless look. In addition to providing a desirable viewing angle as the computing device is opened, the elevation of the portion of the "C" deck including the secondary display device creates a gap underneath to allow for additional thermal venting, to allow for more efficient cooling. As a result, more air may flow through the computing device, through the opening or gap created when the portion of the "C" deck including the secondary display device is lifted.

With reference to the figures, FIG. 1A illustrates a computing device 100 including a first display device 106 and a second display device 110, according to an example. As illustrated, the first display device 106 may be disposed in a first housing 104 of the computing device, and the second display device 110 may be disposed in a second housing 108 that is rotatably coupled to the first housing 104 via a hinge 102. As illustrated, the second display device 110 may be included on a "C" deck of the computing device 100, or a topside of the second housing 108 (e.g., base member of a notebook computer).

As will be further described, as the first housing 104 is rotated opened or closed, the second display device 110 may synchronously move with the rotation of the first housing 104. For example, in response to a rotation of the first housing 104 relative to the second housing 108, a first end 116 of the second display device 110 may slide along a surface of the second housing 108 and a second end 114 of the second display device 110 may slide along a surface of the first housing 104. As a result, the synchronized movement of the second display device 110 may allow for the second end 114 of the second display device 110 to cover at least a substantial portion of the bottom bezel on the first housing 104 as the first housing 104 is rotated, thereby providing a seamless look between the first display device 106 and second display device 110, as illustrated.

Referring to FIG. 1B, portions of the computing device 100 are illustrated in phantom, in order to provide details on the mechanism for allowing synchronized movement of the second display device 110 in response to rotation of the first housing 104 relative to the second housing 108, according to an example. As an example, a connector 112 may be coupled to the hinge 102 and the second display device 110. As illustrated, the connector 112 may be pivotally attached to the second display device 110, for example, at 118. As will be further described, magnetic members may allow for the synchronized movement of the second display device 110 in response to rotation of the first housing 104 relative to the second housing 108.

Referring to FIG. 1B, a magnetic track 120 may be disposed in the second housing 108, to provide an attracting force to hold a portion of the second display device 110 in contact with the surface of the second housing 108, for example, the first end 116 of the second display device 110. As an example, a magnetic member 122 may be included in the second housing 110 to be magnetically attached along the magnetic track 120. Similarly, a magnetic track 124 may be disposed in the first housing 104, to provide an attracting force to hold a portion of the second display device 110 in contact with the surface of the first housing 104, for example, the second end 114 of the second display device 110. As an example, a magnetic member 126 may be included in the second housing 110 to be magnetically attached along the magnetic track 124. The arrangement of the magnetic tracks and associated magnetic members may vary, and are not limited to the arrangement illustrated. As a result of magnetic tracks 120, 124 and their associated magnets 122, 126, synchronized movement of the second display device 110 may be possible in response to rotation of the first housing 104 relative to the second housing 108, as will be illustrated in FIGS. 2A-D.

Figure 2C:
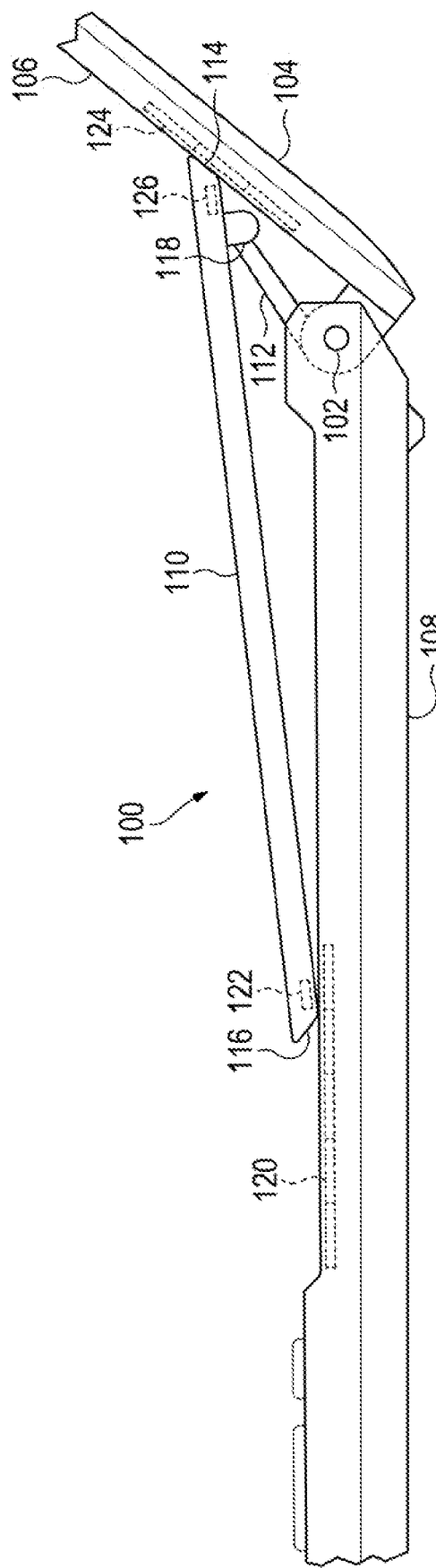

FIGS. 2A-D illustrate synchronized movement of the second display device 110 of computing device 100 as the first housing 104 is rotated open, according to an example. Referring to FIG. 2A, the computing device 100 is closed, where the first housing 104 is closed onto the second housing 108. In this position, the second display device 110 is disposed within a cavity of the second housing 108. Magnetic member 122 is magnetically attached to magnetic track 120 and magnetic member 124 is magnetically attached to magnetic track 124. Referring to FIG. 2B, as the first housing 104 is rotated open, magnetic member 122 remains magnetically attached to magnetic track 120 and magnetic member 124 remains magnetically attached to magnetic track 124. However, as magnetic member 122 moves further along magnetic track 120, compared to the position illustrated in FIG. 2A, magnetic member 126 correspondingly moves along magnetic track 124. As a result, the movement of the second display device 110 may be synchronized with the rotation of the first housing 104.

Referring to FIG. 2B, by magnetic member 126 moving further up the magnetic track 124 as the first housing 104 is rotated open, the viewing angle of the second display device 110 may be raised from the flat position illustrated in FIG. 2A, which may be desirable for a user while utilizing the computing device 100. The raised viewing angle of the second display device 110 may reduce neck fatigue and discomfort for the user. Referring to FIG. 2C, as the first housing 104 continues to be opened, magnetic member 122 continues to move further along magnetic track 120, for example, to the end of the magnetic track 120, and magnetic member 126 correspondingly moves along magnetic track 124 as well. Similar to how the computing device 100 is opened, the second display device 110 may return into the cavity of the second housing 108 when the first housing 104 is rotated back closed.

In addition to providing a desirable viewing angle, the second display device 110 may cover at least a substantial portion of the bottom bezel on the first housing 104 as the first housing 104 is rotated, for example, via the magnetic tracks 120, 124 and their associated magnets 122, 126. As a result, a seamless look may be provided between the first display device 106 and second display device 110, essentially reducing the gap between the second display device 110 and first display device 106, which may be desirable to a user.

In addition to providing a desirable viewing angle as the computing device 100 is opened, the elevation of the portion of the "C" deck including the secondary display device 110 creates a gap underneath as illustrated, for example, to allow for additional thermal venting. As a result, more air may flow through the computing device 100, through the opening or gap created when the portion of the "C" deck including the secondary display device 110 is lifted.

In addition to the gap created underneath the second display device 110, area in the cavity of the second housing 108, by the first end 116 of the second display device 110, becomes available for use as well. As an example, a component may be disposed in the cavity of the second housing 108, available for use when second display device 110 is elevated out of the cavity. Examples of such components include, but are not limited to, an input device, an output device, or a structure associated with thermal management of computing device 100. For example, the components may be a set of keys for input, a set of vents for thermal management, or an audio component, such as a set of speakers for output.

Figure 2D:
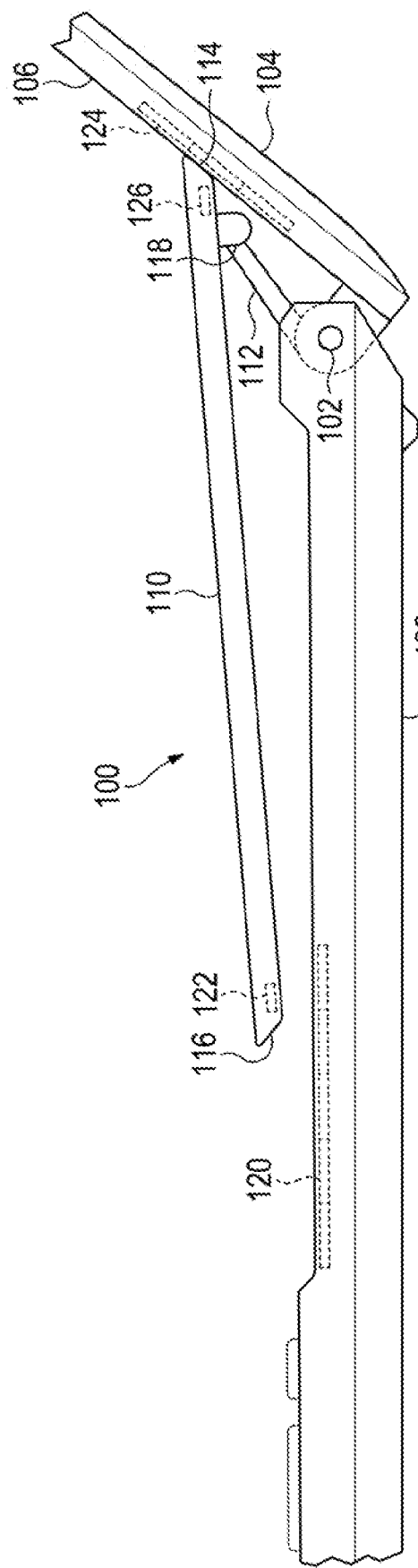

Referring to FIG. 2D, in addition to following magnetic track 120, if an opposing force is applied to overcome the magnetic attraction between magnetic track 120 and magnetic member 122, the angle of the second display device 110 may be adjusted by lifting up the second display device from its first end 116, as illustrated. Similarly, an opposing force may be applied to overcome the magnetic attraction between magnetic track 124 and magnetic member 126, in order to separate the second display device 110 from the first housing 104 at its second end 116.

Figure 3:
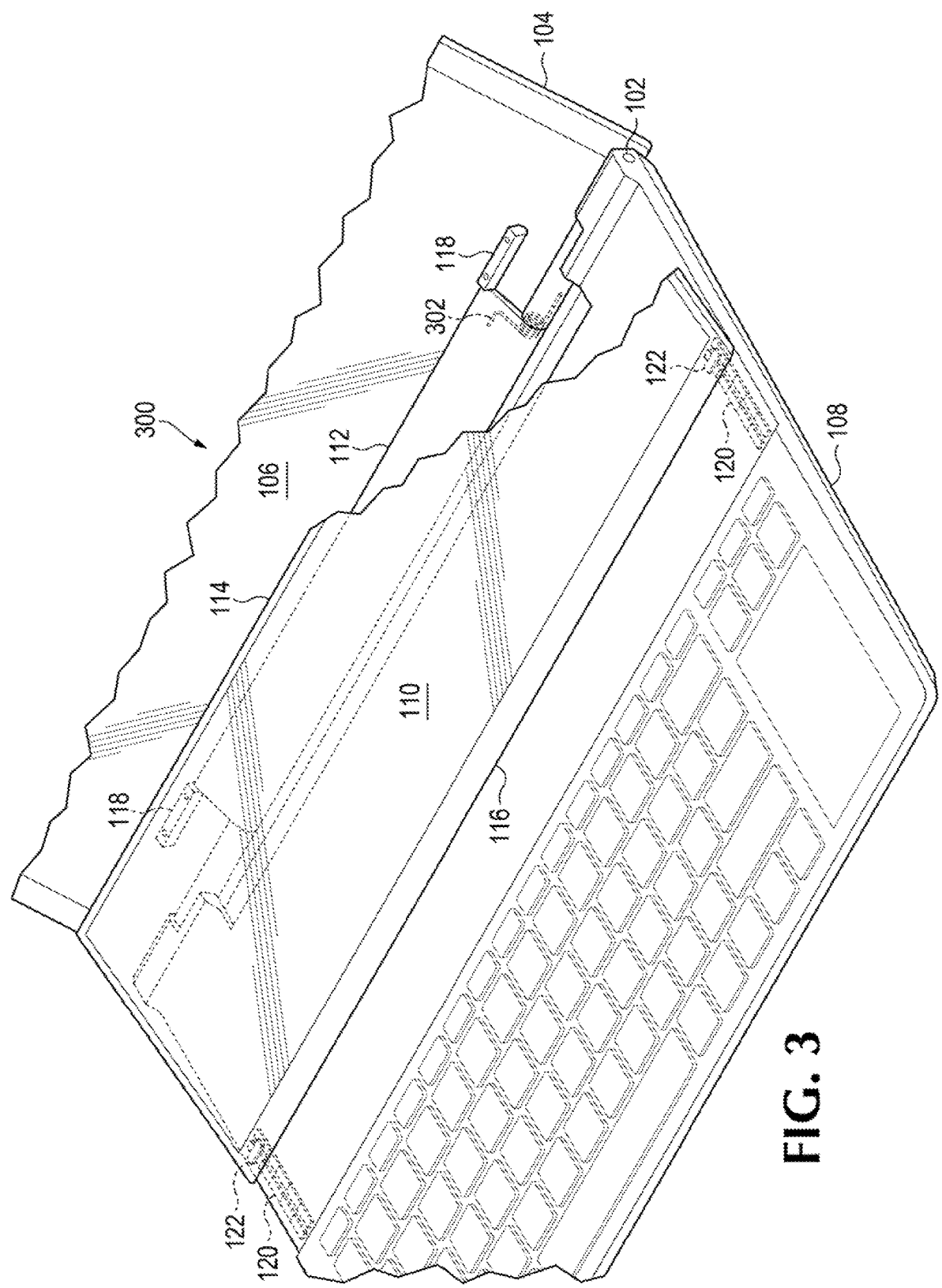
FIG. 3 illustrates a mechanism for allowing synchronized movement of a second display device in response to rotation of a first housing relative to a second housing, according to an example.

FIG. 3 illustrates portions of a computing device 300 in phantom, in order to provide details on the mechanism for allowing synchronized movement of the second display device 110 in response to rotation of the first housing 104 relative to the second housing 108, according to an example. Elements of the computing device 300 may be similar to computing device 100 and, as a result, may share the reference numbers for such elements. As an example, a connector 112 may be coupled to the hinge 102 and the second display device 110. As illustrated, the connector 112 may be pivotally attached to the second display device 110, for example, at 118.

As an example, in order to allow for the synchronized movement of the second display device 110 in response to rotation of the first housing 104 relative to the second housing 108, the connector 112 may include a spring mechanism 302 to bias the connector 112 towards the first housing 104 and, as a result, to cause the second end 114 of the second display device 110 to slide along a surface of the first housing 104 while the first housing 104 is rotated relative to the second housing 108. The arrangement of the spring mechanism 302 may vary, and is not limited to the arrangement illustrated.

In addition to the spring mechanism 302, in order to allow for the synchronized movement of the second display device 110, a magnetic track 120 may be disposed in the second housing 108, to provide an attracting force to hold a portion of the second display device 110 in contact with the surface of the second housing 108, for example, the first end 116 of the second display device 110. As an example, a magnetic member 122 may be included in the second housing 110 to be magnetically attached along the magnetic track 120. As a result of the combined effort from the spring mechanism 302 and the magnetic members (i.e., magnetic track 120 and associated magnetic member 122), synchronized movement of the second display device 110 may be possible in response to rotation of the first housing 104 relative to the second housing 108, as will be illustrated in FIGS. 4A-B.

FIGS. 4A-B illustrate synchronized movement of the second display device 110 of computing device 300 as the first housing 104 is rotated open, according to an example. Referring to FIG. 4A, the computing device 300 is closed, where the first housing 104 is closed onto the second housing 108. In this position, the second display device 110 is disposed within a cavity of the second housing 108. Magnetic member 122 is magnetically attached to magnetic track 120. In addition, spring mechanism 302 may be held under tension while the computing device 300 is closed, in order to bias the connector 112 towards the first housing 104 as it is rotated (e.g., see FIG. 4B).

Referring to FIG. 4B, as the first housing 104 is rotated open, spring mechanism 302 may bias the connector 112 towards the first housing 104 and, as a result, cause the second end 114 of the second display device 110 to slide along a surface of the first housing 104. In addition, by relying on the spring mechanism 302 to bias the connector 112 towards the first housing 104, magnetic member 122 moves further along magnetic track 120, compared to the position illustrated in FIG. 4A. As an example, the spring mechanism 302 may continue to be held under tension while the first housing 104 is rotated open, in order for the connector 112 to remain biased towards the first housing 104. Similar to how the computing device 300 is opened, the second display device 110 may return into the cavity of the second housing 108 when the first housing 104 is rotated back closed.

Although spring mechanisms or magnetic members, or a combination of them were described in order to provide synchronized movement of a second display device in response to rotation of a first housing relative to the second housing, other mechanisms may be relied upon as well. For example, gear mechanisms may be relied on to provide for the synchronized movement.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A computing device comprising:
   a hinge;
   a first housing;
   a first display device disposed in the first housing;
   a second housing rotatably coupled to the first housing via the hinge;
   a second display device disposed in the second housing; and
   a connector coupled to the hinge and the second display device, wherein, in response to a rotation of the first housing relative to the second housing, a first end of the second display device is to slide along a surface of the second housing and a second end of the second display device is to slide along a surface of the first housing.

2. The computing device of claim 1, wherein the connector is pivotally attached to the second display device.

3. The computing device of claim 1, further comprising a magnetic track disposed in the second housing, wherein the magnetic track is to provide an attracting force to hold a portion of the second display device in contact with the surface of the second housing.

4. The computing device of claim 1, wherein the second end of the second display device is to remain magnetically coupled to the surface of the first housing as the first housing is to be rotated relative to the second housing.

5. The computing device of claim 1, wherein the connector comprises a spring mechanism to bias the connector towards the first housing.

6. The computing device of claim 5, wherein, in response to the rotation of the first housing relative to the second housing, the spring mechanism is to cause the second display device is to slide along the surface of the first housing.

7. A computing device comprising:
   a hinge;
   a first housing comprising:
      a first display device; and
      a first magnetic track;
   a second housing rotatably coupled to the first housing via the hinge, the second housing comprising a second magnetic track; and
   a second display device disposed in the second housing, wherein, in response to a rotation of the first housing relative to the second housing, a first end of the second display device is to remain magnetically attached to the second housing via the second magnetic track and a second end of the second display device is to remain magnetically attached to the first housing via the first magnetic track.

8. The computing device of claim 7, further comprising a connector coupled to the hinge and the second display device.

9. The computing device of claim 7, wherein the first end of the second display device comprises a first magnetic member to remain magnetically attached to the second magnetic track, and the second end of the second display device comprises a second magnetic member to remain magnetically attached to the first magnetic track.

10. The computing device of claim 9, wherein the first magnetic member to remain magnetically attached to the second magnetic track comprises the first end of the second display device to slide along a surface of the second housing.

11. The computing device of claim 10, wherein the second magnetic member to remain magnetically attached to the first magnetic track comprises the second end of the second display device to slide along a surface of the first housing.

12. A computing device comprising:
   a hinge;
   a first housing;
   a first display device disposed in the first housing;
   a second housing rotatably coupled to the first housing via the hinge, the second housing comprising a magnetic track;
   a second display device disposed in the second housing; and
   a connector coupled to the hinge and the second display device, the connector comprising a spring mechanism to bias the connector toward the first housing, wherein, in response to a rotation of the first housing relative to the second housing, the spring mechanism is to cause a first end of the second display device is to slide along a surface of the first housing, and a second end of the second display device is to remain magnetically attached to the second housing via the magnetic track.

13. The computing device of claim 12, wherein the connector is pivotally attached to the second display device.

14. The computing device of claim 12, wherein the spring mechanism is held under tension in order to bias the connector toward the first housing.

15. The computing device of claim 12, wherein the second end of the second display device comprises a magnetic member to remain magnetically attached to the magnetic track.

* * * * *